(12) United States Patent
Freisinger et al.

(10) Patent No.: US 8,210,494 B2
(45) Date of Patent: Jul. 3, 2012

(54) METHOD AND APPARATUS FOR MANUALLY OPENING A VALVE WITH A TOLERANCE COMPENSATING STEM

(75) Inventors: Paul W. Freisinger, Stockholm, NJ (US); Ahmad Abbas Chaudhry, North Brunswick, NJ (US)

(73) Assignee: Automatic Switch Company, Florham Park, NJ (US)

( * ) Notice: Subject to any disclaimer, the term of this patent is extended or adjusted under 35 U.S.C. 154(b) by 392 days.

(21) Appl. No.: 12/650,483

(22) Filed: Dec. 30, 2009

(65) Prior Publication Data

US 2011/0088788 A1     Apr. 21, 2011

Related U.S. Application Data

(60) Provisional application No. 61/253,734, filed on Oct. 21, 2009.

(51) Int. Cl.
*F16K 31/02* (2006.01)
*F16K 31/44* (2006.01)
*F16K 25/00* (2006.01)

(52) U.S. Cl. .......... 251/129.03; 251/77; 251/85
(58) Field of Classification Search .......... 251/77, 251/84–88, 129.01, 129.03
See application file for complete search history.

(56) References Cited

U.S. PATENT DOCUMENTS

| | | | |
|---|---|---|---|
| 4,501,299 A * | 2/1985 | Klimowicz et al. | 137/625.65 |
| 4,930,228 A | 6/1990 | Anderson et al. | |
| 6,527,248 B1 * | 3/2003 | Muller | 251/111 |
| 2002/0017626 A1 | 2/2002 | Gagnon | |

FOREIGN PATENT DOCUMENTS

| | | |
|---|---|---|
| EP | 0762026 | 3/1997 |
| WO | 9612906 | 5/1996 |
| WO | 2008148403 | 12/2008 |

OTHER PUBLICATIONS

F. Lanel, International Search Report for International Patent Application No. PCT/US2010/053165, European Patent Office, dated Feb. 1, 2011.

(Continued)

*Primary Examiner* — John K Fristoe, Jr.
*Assistant Examiner* — Daphne M Barry
(74) *Attorney, Agent, or Firm* — Locke Lord LLP

(57) ABSTRACT

An automatically adjusting control valve comprises a valve body; a valve seat within the valve body; a sealing disc adjacent the valve seat when the valve is closed and offset from the valve seat when the valve is open; an armature adjacent the sealing disc and operable to move the sealing disc linearly within the valve body; a biasing mechanism which biases the armature toward a first position; and an actuation stem configured to overcome the biasing mechanism and move the armature between the first position and a second position upon manual operation. The actuation stem may comprise a portion which engages the armature during movement between the first position and the second position The portion may be configured to deform to accommodate manufacturing tolerances of the valve.

19 Claims, 7 Drawing Sheets

OTHER PUBLICATIONS

F. Lanel, Written Opinion for International Patent Application No. PCT/US2010/053165, European Patent Office, dated Feb. 1, 2011.

ASCO RedHat, "General Service Solenoid Valves—2/2 Series 8262 and 8263—Direct Acting, Normally Closed, Brass or Stainless Steel Bodies 1/8" to 3/8" NPT," ASCO RedHat, ASCO Valve Catalog 34, pp. 1, [retrieved from the Internet on Mar. 26, 2010 using <Url: http://www.ascovalve.com/Common/PDFFiles/Product/8262_8263_HSeries_GP_R1.pdf>].

ASCO, "Optional Features—Construction—Manual Operators," ASCO Valve Catalog 34, pp. 500, [retrieved from the Internet on Mar. 26, 2010 using <URL: http://www.ascovalve.com/Common/PDF-Files/Product/OptionalFeaturesR1.pdf>].

ASCO RedHat, "Installation & Maintenance Instructions—Series 8262 and 8263," ASCO RedHat, Form No. V7502, pp. 1-4, [retrieved from the Internet on Mar. 26, 2010 using <URL: http:www.ascovalvenet.com/PDF/IMSheets/v7502.pdf>].

\* cited by examiner

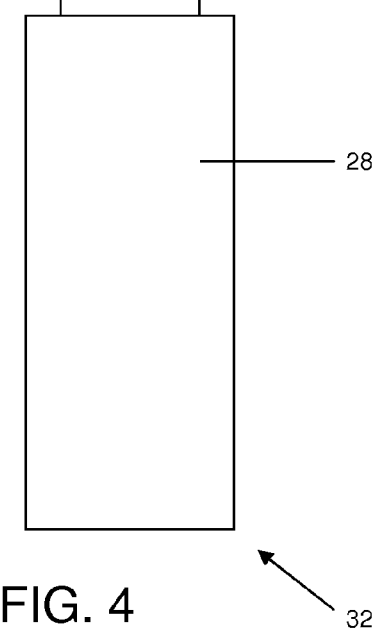
FIG. 4
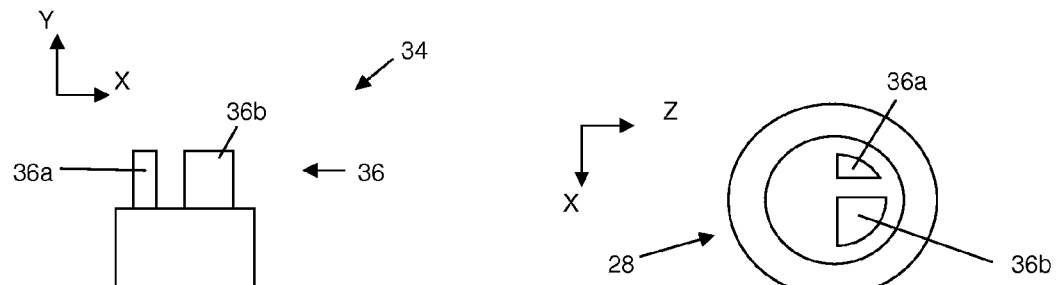
FIG. 6
FIG. 5
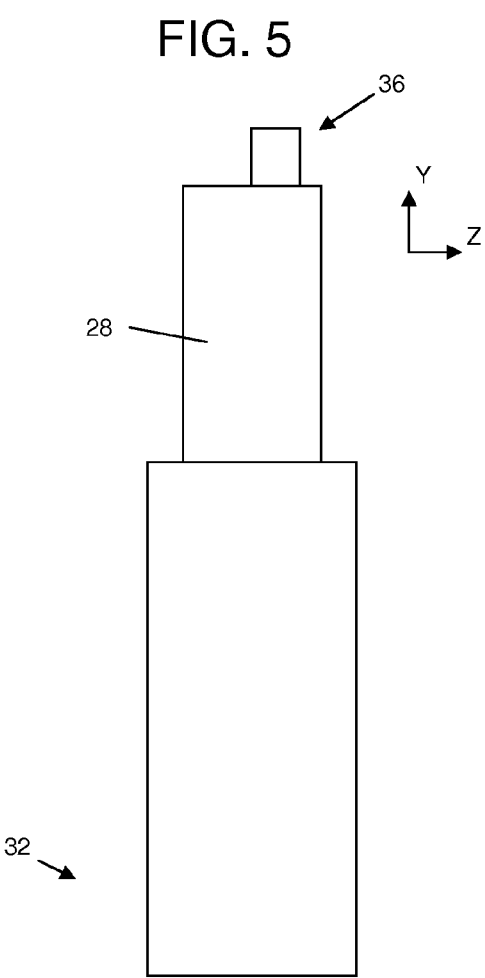

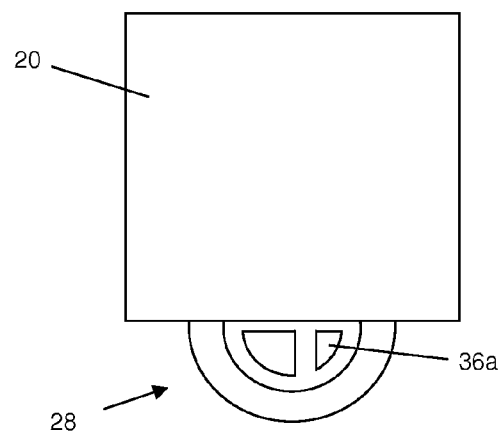
FIG. 10
FIG. 11
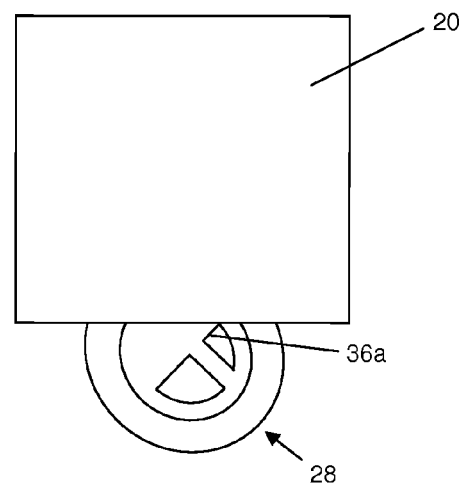
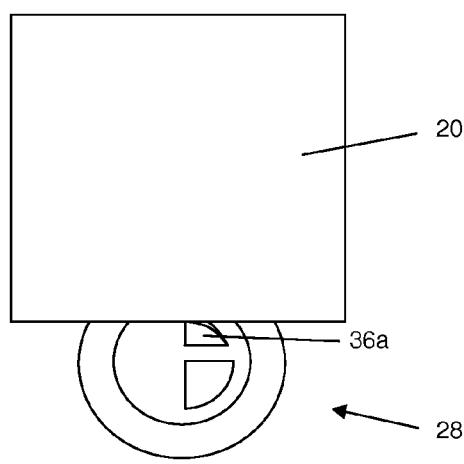
FIG. 12

METHOD AND APPARATUS FOR MANUALLY OPENING A VALVE WITH A TOLERANCE COMPENSATING STEM

CROSS REFERENCE TO RELATED APPLICATIONS

This application is related to, and claims priority of, U.S. Provisional Patent Application Ser. No. 61/253,734, filed Oct. 21, 2009, which is incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to control valves; and more specifically relate to pneumatic and/or hydraulic control valves.

2. Description of the Related Art

Typical control valves are known in the art. For example, control valves are available from ASCO Valve, Inc. Furthermore, electrical, pneumatic and/or hydraulic control valves often utilize manual operators. However, manufacturing tolerances and/or variances may require adjustment and/or fitting, and/or may otherwise complicate assembly of such control valves.

The inventions disclosed and taught herein are directed to an improved device for self adjustment, such as to accommodate manufacturing tolerances in pneumatic and/or hydraulic control valves.

BRIEF SUMMARY OF THE INVENTION

The present invention comprises an automatically adjusting control valve, and a method of manufacture, assembly and/or operation thereof. The valve comprises a valve body; a valve seat within the valve body; a sealing disc adjacent the valve seat when the valve is closed and offset from the valve seat when the valve is open; an armature adjacent the sealing disc and operable to move the sealing disc linearly within the valve body; a biasing mechanism which biases the armature toward a first position; and an actuation stem configured to overcome the biasing mechanism and move the armature between the first position and a second position upon manual operation. The actuation stem may comprise a portion which engages the armature during movement between the first position and the second position. The portion may be configured to deform to accommodate manufacturing tolerances of the valve. The stem may be configured to move from a zero position to a hold position. During initial operation of the stem, the armature completely traverses from the first position to the second position by movement of the stem from the zero position to a deformation position, with the deformation position being between the zero position and the hold position. Initial movement of the stem between the deformation position and the hold position may deform the portion of the stem, thereby accommodating manufacturing tolerances of the valve. The stem may be operated by rotation about an axis and the portion is offset from the axis, such that rotation of the stem causes the portion to push the armature from the first position to the second position overcoming the bias mechanism.

A method of automatic adjustment of a control valve may comprise the steps of: positioning an armature adjacent a valve seat of a valve body; positioning an actuating stem at least partially within the valve body; operating the stem until the armature has reached a full stroke position; and continuing to operate the stem with the armature in the full stroke position, causing the stem to adjust to manufacturing tolerances of the valve while maintaining the armature in the full stroke position. The continuing step may comprise deforming at least a portion of the stem. The continuing step may comprise deforming an eccentric portion of the stem. Operating the stem may comprise manually rotating the stem, which linearly moves the armature until the armature has reached the full stroke position, at which point continuing to operate the stem comprises deforming an eccentric portion of the stem, until the stem has been rotated at least ninety degrees, at which point the stem has been adjusted and is operable to hold the armature in the full stroke position without continued manipulation.

BRIEF DESCRIPTION OF THE SEVERAL VIEWS OF THE DRAWINGS

FIG. 4 illustrates a front elevation view of a particular embodiment of a stem of the control valve utilizing certain aspects of the present inventions;

FIG. 5 illustrates a side elevation view of a particular embodiment of the stem of FIG. 4;

FIG. 6 illustrates a plan view of a particular embodiment of the stem of FIG. 4;

FIG. 10 illustrates a partial cut-away view of particular components of the control valve shown in FIG. 1;

FIG. 11 illustrates a partial cut-away view of particular components of the control valve shown in FIG. 2;

FIG. 12 illustrates a partial cut-away view of particular components of the control valve shown in FIG. 3.

DETAILED DESCRIPTION OF THE INVENTION

Figure 1:
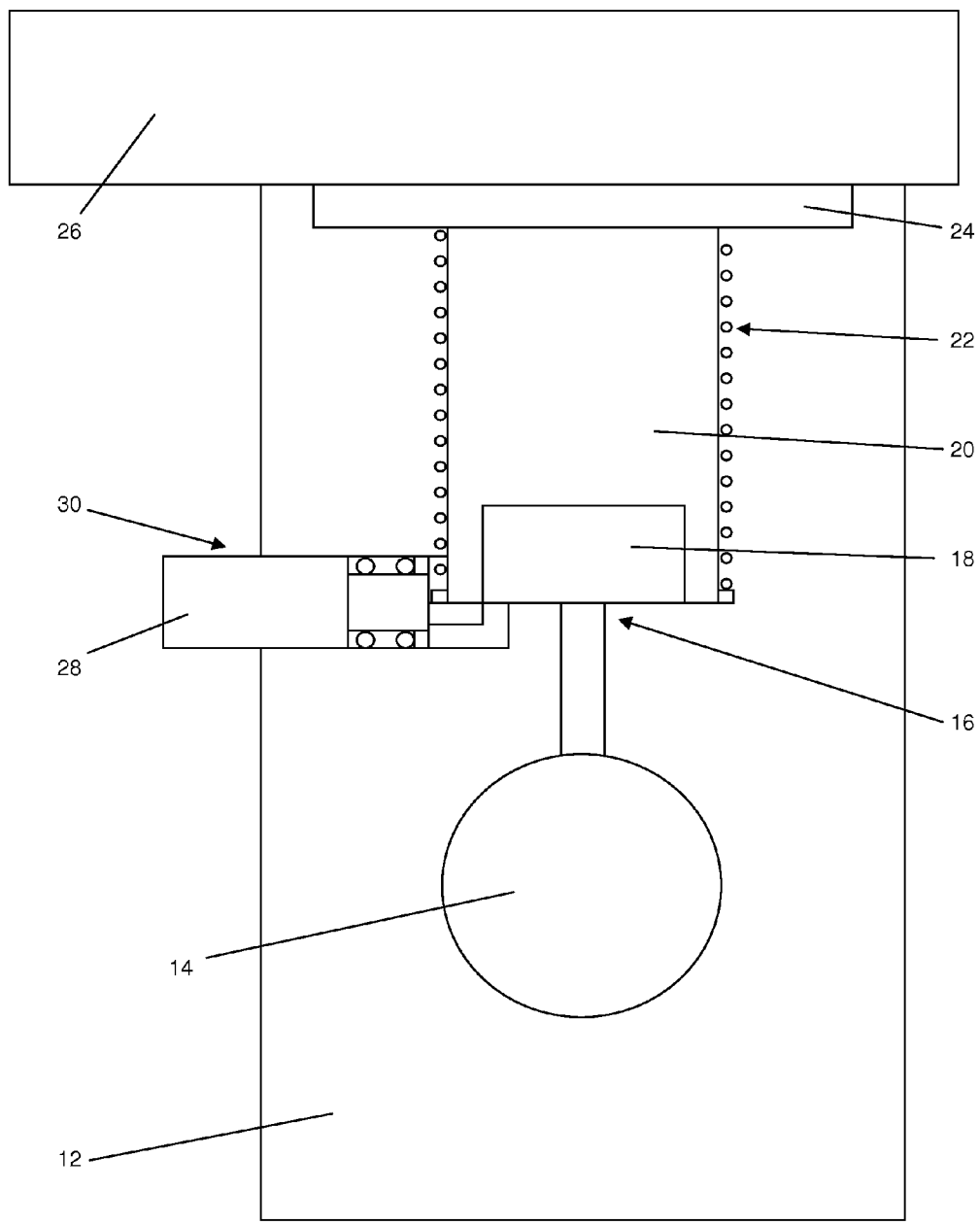
FIG. 1 illustrates a cut-away view of a particular embodiment of a control valve utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an automatically adjusting control valve, and a method of manufacture, assembly and/or operation thereof. The valve comprises a valve body; a valve seat within the valve body; a sealing disc adjacent the valve seat when the valve is closed and offset from the valve seat when the valve is open; an armature adjacent the sealing disc and operable to move the sealing disc linearly within the valve body; a biasing mechanism which biases the armature toward a first position; and an actuation stem configured to overcome the biasing mechanism and move the armature between the first position and a second position upon manual operation. The actuation stem may comprise a portion which engages the armature during movement between the first position and the second position. The portion may be configured to deform to accommodate manufacturing tolerances of the valve. The stem may be configured to move from a zero position to a hold position. During initial operation of the stem, the armature completely traverses from the first position to the second position by movement of the stem from the zero position to a deformation position, with the deformation position being between the zero position and the hold position. Initial movement of the stem between the deformation position and the hold position may deform the portion of the stem, thereby accommodating manufacturing tolerances of the valve. The stem may be operated by rotation about an axis and the portion is offset from the axis, such that rotation of the stem causes the portion to push the armature from the first position to the second position overcoming the bias mechanism.

A method of automatic adjustment of a control valve may comprise the steps of: positioning an armature adjacent a valve seat of a valve body; positioning an actuating stem at least partially within the valve body; operating the stem until the armature has reached a full stroke position; and continuing to operate the stem with the armature in the full stroke position, causing the stem to adjust to manufacturing tolerances of the valve while maintaining the armature in the full stroke position. The continuing step may comprise deforming at least a portion of the stem. The continuing step may comprise deforming an eccentric portion of the stem. Operating the stem may comprise manually rotating the stem, which linearly moves the armature until the armature has reached the full stroke position, at which point continuing to operate the stem comprises deforming an eccentric portion of the stem, until the stem has been rotated at least ninety degrees, at which point the stem has been adjusted and is operable to hold the armature in the full stroke position without continued manipulation.

FIG. 1 is an illustration of an automatically adjusting control valve 10. The valve 10 preferably includes a valve body 12 with a main opening 14 in communication with a valve seat 16. A sealing disc 18 may be placed adjacent and/or abutting the seat 16. When adjacent and/or abutting the seat 16, the sealing disc 18 seals off the seat 16, and thus the main opening 14, thereby closing the valve 10. The disc 18 may also be moved and/or offset from the seat 16, thereby opening the valve 10.

Figure 2:
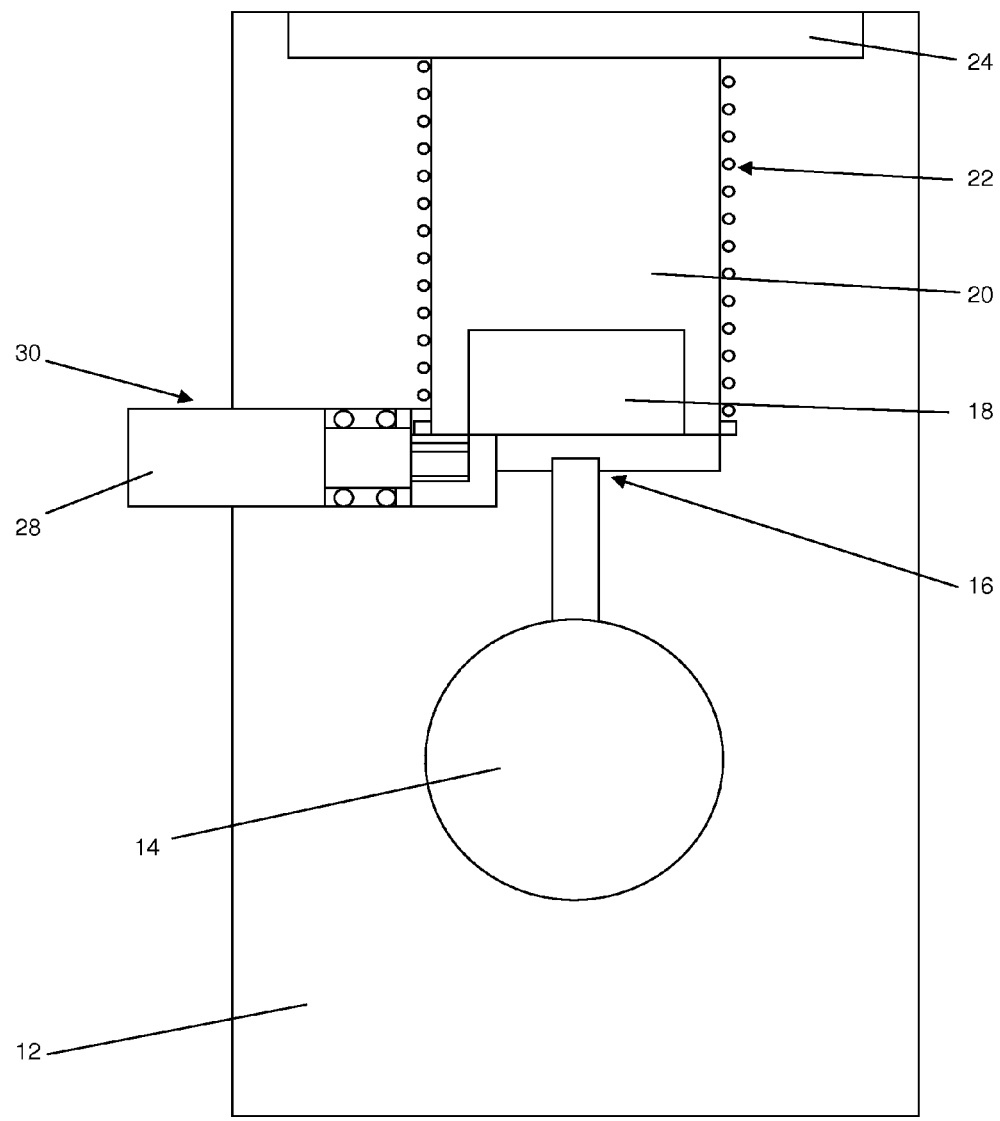
FIG. 2 illustrates another cut-away view of a particular embodiment of a control valve utilizing certain aspects of the present inventions.
Figure 3:
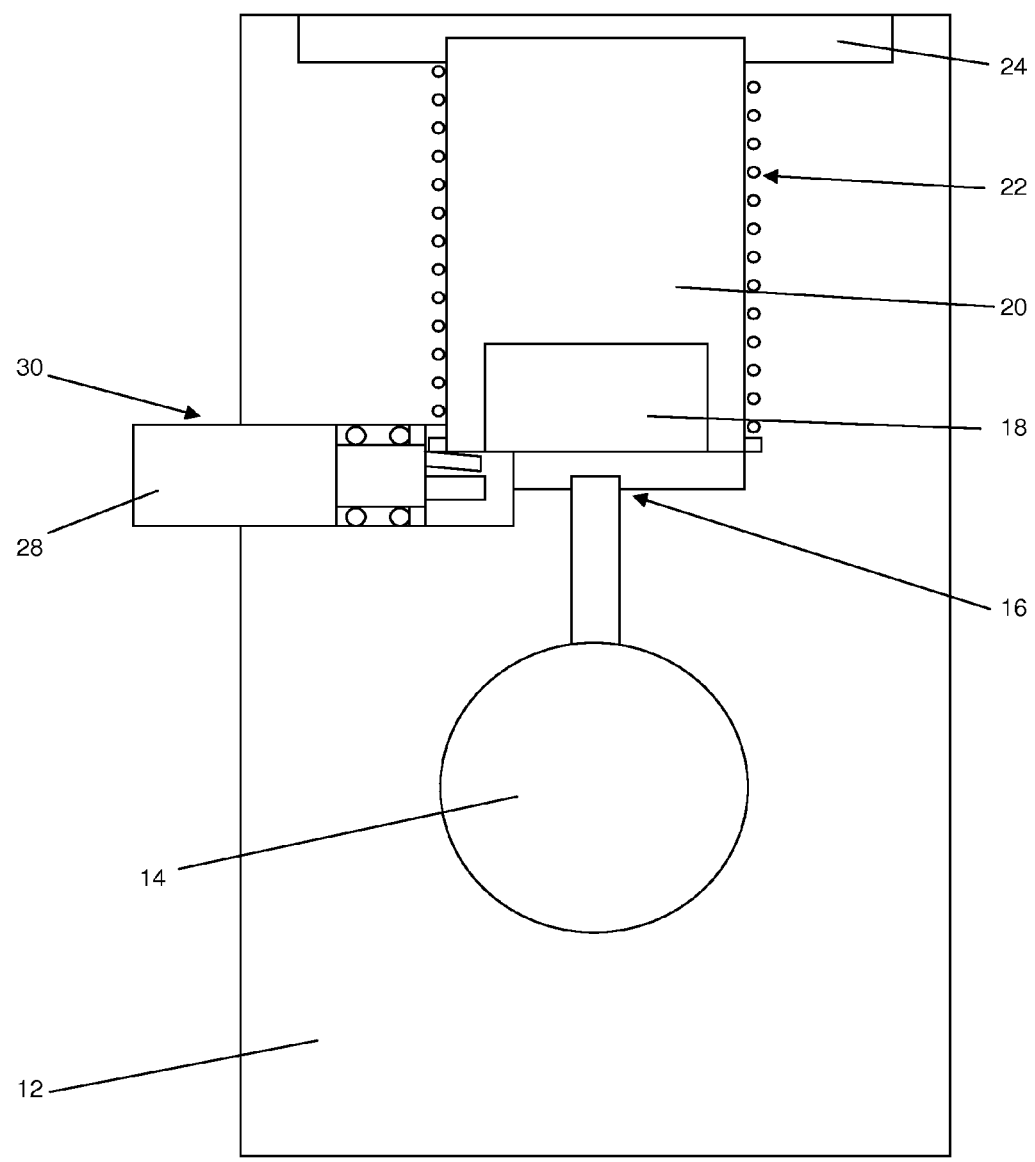
FIG. 3 illustrates another cut-away view of a particular embodiment of a control valve utilizing certain aspects of the present inventions.

More specifically, in a fully closed position, as shown in FIG. 1, the disc 18 is adjacent and/or abutting the seat 16, thereby sealing off the seat, and thus the opening 14, fully closing the valve 10. As shown in FIG. 2 and FIG. 3, in a fully open, or full stroke, position, the disc 18 is offset from the seat 16, thereby opening the valve 10. The valve 10 may be rated for a pressure it can seal, or otherwise withstand, such as in the fully closed position. The valve 10 may also be rated for a quantity of process control media, such as a liquid or a gas, that it can pass in the fully open, or full stroke, position. Thus, the ability to maintain the fully open position may be critical to proper operation of a process control system in which the valve 10 may be used.

The valve 10 may also include an armature 20 adjacent the sealing disc 18 and operable to move the sealing disc 18 linearly within the valve body 12. More specifically, the armature 20 may house or otherwise receive the disc 18 therein, causing the disc 18 to move with the armature 20 between the fully closed position and the fully open position.

The armature 20, and thus the disc 18, may be biased toward the seat 16, and thus the fully closed position, by a bias mechanism 22. In one preferred embodiment, the bias mechanism 22 is a spring. However, in other embodiments, the bias mechanism may take other forms, such as a pneumatic pressure, a resilient member, a magnetic force, or an electromagnetic force, etc. Of course, the armature 20, and thus the disc 18, may be biased away from the seat 16, and thus toward the fully open position, by the bias mechanism 22. The former case would be useful in a normally closed valve, as shown, with the latter being useful in a normally open valve.

The valve 10 may also include a movement limiter 24, which may or may not be integral to the valve body 12, the armature 20 itself, and/or some other component of the valve 10 or process control system. The movement limiter 24 may be operable to limit movement of the armature 20, and thus the sealing disc 18, to between the fully closed position and the fully open position.

The valve 10 may be operated with an operator 26, such as a solenoid or some other mechanical, electrical, pneumatic, and/or electromechanical operator. The operator 26 may be used for normal operations of the valve 10 within the process control system.

The valve 10 may also include a manual operator, which may be used as a manual override and/or simply a mechanism for holding the valve 10 fully open or fully closed. For example, the manual operator may take the form of a stem 28 configured to move the armature 20 from the fully closed position to the fully open position. More specifically, in one embodiment, the stem 28 is configured to overcome the spring 22, such as through manual rotation of the stem 28.

The stem 28 may be configured to rotate ninety degrees from a zero position, where the armature 20 is in the fully closed position, and a hold position, where the stem 28 holds the armature 20 in the fully open position. As discussed above, FIG. 1 shows the valve 10 in the fully closed position, with the stem 28 in the zero position. FIG. 3 shows the valve 10 in the fully open position, with the stem 28 in the hold position. FIG. 2 shows the valve 10 in the fully open position, with the stem 28 in a deformation position, which will be explained in more detail below.

As shown in FIG. 1, the stem 28 may protrude through a portal 30 in a sidewall of the body 12 of the valve 10. The stem 28 may be sealed to the body 12, such as with one or more O-rings or some other flexible and/or resilient seal 32, between the stem's 28 outer perimeter and the portal 30. Similarly, the armature 20 may be sealed to the body 12 using one or more O-rings and/or other sealing techniques. The stem 28 may be confined to limited movement within the portal 30 by a retaining ring and/or other components of the valve 10. The retaining ring may be made of steel or another sufficient durable material.

As shown in FIG. 4, FIG. 5, FIG. 6, FIG. 7, FIG. 8, and FIG. 9, in at least one embodiment, the stem 28, or at least a portion thereof, may be cylindrical. The stem 28 is preferably a single unitary structure with no moving parts. The stem 28 may include an exterior portion 32 and an interior portion 34. Additional handles and/or other mechanisms may be attached to the exterior portion 32. Alternatively, the exterior portion 32 may include serrations, grooves, be knurled, and/or include some other feature that assists a user in manually operating the stem 28.

The interior portion 34 of the stem 28 may engage the armature 20, either directly or indirectly, during movement of the armature 20 between the fully closed position and the fully open position. More specifically, the interior portion 34 may include one or more protrusions 36 which move the armature 20 between the fully closed position and the fully open position, upon operation of the stem 28.

In one embodiment, as shown, the interior portion 34 of the stem 28 includes two protrusions 36a, 36b. A primary protrusion 36a may be configured to deform to accommodate manufacturing tolerances of the valve 10, as will be discussed in more detail below. A backup, or secondary protrusion 36b may be configured to support the primary protrusion 36a, limit deformation of the primary protrusion 36a, provide for manual operation of the valve 10 should the primary protrusion 36a fail, or otherwise backup the primary protrusion 36a. The backup, or secondary protrusion 36b may also be useful to facilitate assembly of the stem 28 into the valve body 12.

Figure 9:
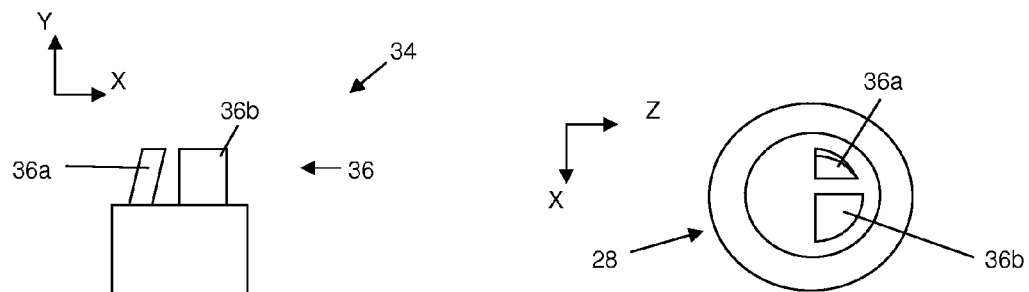
FIG. 9 illustrates a plan view of a particular embodiment of the stem of FIG. 7.
Figure 7:
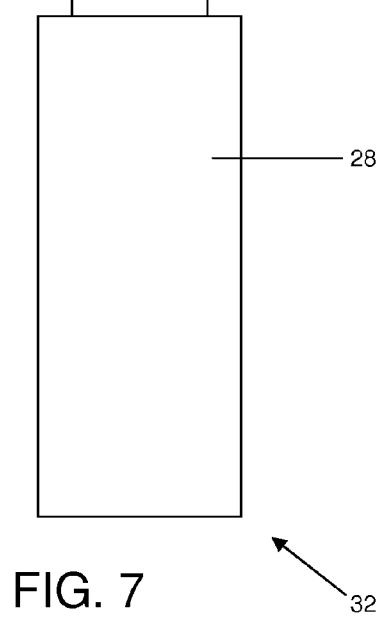
FIG. 7 illustrates a front elevation view of a particular embodiment of a stem of the control valve utilizing certain aspects of the present inventions.
Figure 8:
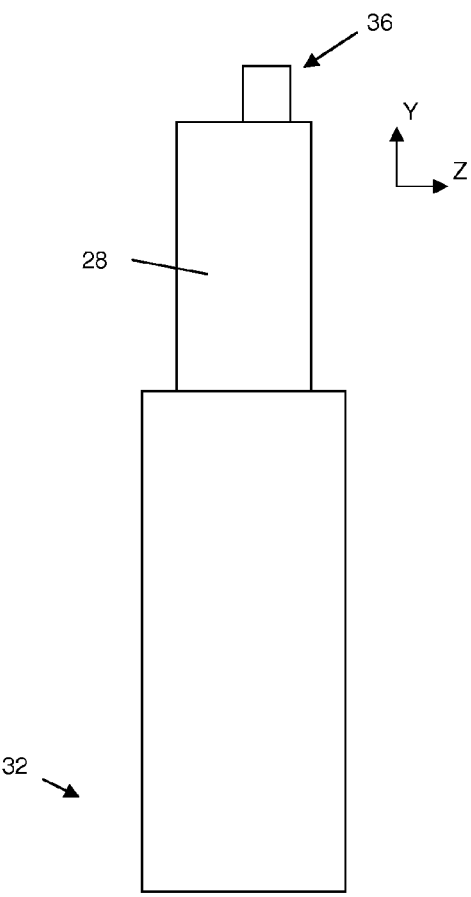
FIG. 8 illustrates a side elevation view of a particular embodiment of the stem of FIG. 7.

More specifically, FIG. 4, FIG. 5, and FIG. 6 show one initial embodiment of the stem 28 before deformation to accommodate manufacturing tolerances of the valve 10. FIG. 7, FIG. 8, and FIG. 9 show one subsequent embodiment of the stem 28 after deformation to accommodate manufacturing tolerances of the valve 10. A primary difference in the two embodiments, is the deformation of the primary protrusion 36a of the interior portion 34 of the stem 28. The degree to which the primary protrusion 36a is deformed may be used to accommodate manufacturing tolerances, or variation, of the valve 10.

More specifically, the valve 10 may be designed for the primary protrusion 36a to deform as shown in FIG. 7 and FIG. 9. In this case, the primary protrusion 36a to deform more or less depending on actual manufacturing, construction, or assembly of the valve 10. Alternatively, the valve 10 may be designed for the primary protrusion 36a to deform more or less that that shown in FIG. 7 and FIG. 9. Additionally, the valve 10 may be designed for the primary protrusion 36a to not deform at all, with any deformation being due to some manufacturing variation in the valve 10.

Referring now to FIG. 1 and FIG. 10, which show select components of the valve 10 in similar positions. As shown, the armature 20 and disc 18 of the valve 10 are in the fully closed position, with the stem 28 in the zero position. This may occur at any time, but for purposes of this description, the reader is asked to presume that this is after initial assembly of the valve 10. As can be seen, the interior portion 34 of the stem 28 has not been deformed, or has returned to a neutral position. Of course, the embodiment shown is a normally closed valve. If the embodiment shown was a normally open valve, the armature 20 and disc 18 of the valve 10 might be in the fully open position, with the stem 28 in the zero position.

Referring now to FIG. 2 and FIG. 11, which also show select components of the valve 10 in similar positions. As shown, the armature 20 and disc 18 of the valve 10 are in the fully open position, with the stem 28 having been rotated to a deformation position. In this fully open position, the process control media can pass though the valve 10 according to the full rating of the valve 10. However, at least partially because the bias mechanism 22 continues to exert bias on the armature 20, a user must continue to hold, or otherwise manipulate, the stem 28 to keep the valve 10 in the fully open position, with the stem 28 in this deformation position. In other words, continued manipulation of the stem 28 is required to overcome the bias mechanism 22 with the stem 28 between the zero position and the deformation position, or at the deformation position. More specifically, if the user releases the stem 28, the stem 28 will return toward the zero position and the armature 20 will return toward the fully closed position, at least partially due to the bias of the bias mechanism 22. Of course, the embodiment shown is a normally closed valve. If the embodiment shown was a normally open valve, the armature 20 and disc 18 of the valve 10 might be biased to return toward the fully open position.

Thus, at least during initial operation of one embodiment of the stem 28, the armature 20 completely traverses from the fully closed position to the fully open position by movement of the stem from the zero position to the deformation position. The movement limiter 24 and/or some other mechanism may prevent further movement of the armature 20 and disc 18.

However, as shown in FIG. 3 and FIG. 12, at least initial continued movement of the stem 28 between the deformation position and a hold position deforms the interior portion 34 of the stem 28, thereby accommodating manufacturing tolerances of the valve 10. More specifically, as the stem 28 is moved between the deformation position and the hold position, the primary protrusion 36a of the interior portion 34 of the stem 28 is deformed, crushed, or bent, away from the armature 20 and/or by the armature 20. This deformation accommodates, or self adjusts for, manufacturing tolerances, or variation, of the valve 10. It is expected to take additional force on the part of the user to move the stem 28 from the deformation position to the hold position, as compared to the force required to move the stem 28 from zero position to the deformation position, at least initially.

Thus, at least the primary protrusion 36a of the interior portion 34 of the stem 28 is preferably deformable, crushable, bendable, or malleable, to some degree. In some embodiments, at least the primary protrusion 36a of the interior portion 34 of the stem 28 is resilient, and therefore returns to the neutral position. However, in preferred embodiments, the primary protrusion 36a of the interior portion 34 of the stem 28 preferably substantially retains the shape induced by the deformation, making subsequent operations, from the zero position, through the deformation position, to the hold position smooth and requiring minimal effort on the part of the user. Thus, at least in the preferred embodiments, the stem 28 is a single rotatable structure with no additional moving parts after initial deformation.

In one embodiment, the stem 28 is constructed from 303 stainless steel. The material has good corrosion resistance and machinability characteristics. This material is also able to be deformed without fracturing. Other materials with these properties may be used, depending upon the application. While other materials such as brass also have good formability, 303 stainless steel has an additional benefit in that it's yield strength is high enough so that the deformation of the primary protrusion 36a is not necessarily completely permanent. Meaning, when the stem 28 is rotated to back to the zero position, the primary protrusion 36a may spring back a slight amount. With subsequent operations the primary protrusion 36a then works within the elastic range of the material, providing a degree of clamping force to the armature 20 against the movement limiter 24. This clamping or spring like force may be beneficial in that it may allow for some repeated bending of the primary protrusion 36a to compensate for part movement and component wear with repeated operations.

It can be seen that the hold position is about ninety degrees, or more, from the zero position. Thus, in the hold position continued manipulation of the stem 28 is not required to overcome the bias mechanism 22. More specifically, if the user releases the stem 28, the stem 28 will remain in the hold position and the armature 20 will remain in the fully open position, and the process control media can pass though the valve 10 according to the full rating of the valve 10. Of course, the embodiment shown is a normally closed valve. If the embodiment shown was a normally open valve, the armature 20 and disc 18 of the valve 10 might remain in the fully closed position, with the stem 28 in the hold position. It can also be seen, that the deformation position is between the zero position and the hold position.

In at least one embodiment, the movement limiter 24, or some other mechanism, resists movement of the armature 20 enough to deform the primary protrusion 36a of the interior portion 34 of the stem 28. Of course, it can also be seen that the bias mechanism does not resist movement of the armature 20 enough to deform the stem 28.

As shown, the protrusions 36 of the interior portion 34 of the stem 28 are eccentric to the rest of the stem 28. More specifically, as can be seen, at least one embodiment of the stem 28 extends along, and rotates about, a central axis. The protrusions 36 of the interior portion 34 is/are offset from the axis, such that rotation of the stem 28 causes the portion to push the armature 20 from a first position, fully closed position, to a second position, fully open position, overcoming the bias mechanism, or spring, 22.

Other and further embodiments utilizing one or more aspects of the inventions described above can be devised without departing from the spirit of Applicant's invention. For example, the stem 28 may be operated linearly, such as into and out of the body 12 of the valve 10. In this case, one can see how the deformation of the primary protrusion 36a of the interior portion 34 of the stem 28 would be similar, but may require different protrusions. Further, the various methods and embodiments of the invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

Figure 13:
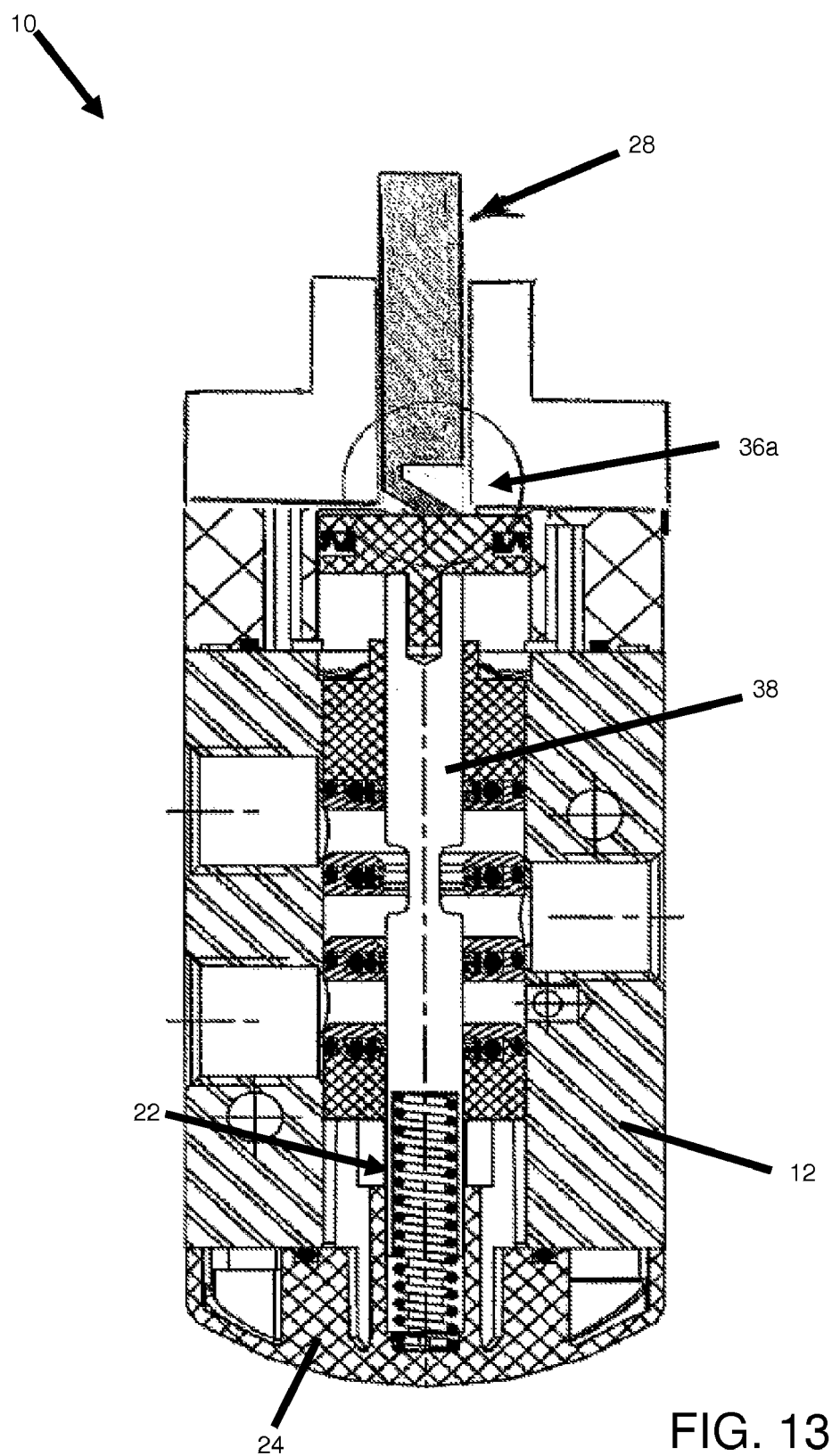
FIG. 13 illustrates a cut-away view of another particular embodiment of a control valve utilizing certain aspects of the present inventions.

The present invention is not limited to solenoid valves with armatures, sealing discs and/or seats. For example, this invention could also be used to actuate a spool 38 of a spool valve, as shown in FIG. 13. In fact, this invention could be incorporated into the actuation mechanism of any mechanical device where automatic tolerance compensation would be beneficial.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of automatic adjustment of a control valve, the method comprising the steps of:
    positioning an armature adjacent a valve seat of a valve body;
    positioning an actuating stem at least partially within the valve body;
    operating the stem until the armature has reached a full stroke position; and
    continuing to operate the stem with the armature in the full stroke position, causing the stem to deform to adjust to manufacturing tolerances of the valve while maintaining the armature in the full stroke position, wherein the stem thereafter substantially retains a shape induced by the deformation; wherein the portion of the stem is a primary protrusion, wherein the stem further comprises a secondary protrusion, and wherein the secondary protrusion limits deformation of the primary protrusion and provides for manual operation of the valve should the primary protrusion fail.

2. The method of claim 1, wherein the continuing step comprises deforming at least a portion of the stem.

3. The method of claim 1, wherein the continuing step comprises deforming an eccentric portion of the stem.

4. The method of claim 1, wherein operating the stem comprises manually rotating the stem, which linearly moves the armature until the armature has reached the full stroke position, at which point continuing to operate the stem comprises deforming an eccentric portion of the stem, until the stem has been rotated at least ninety degrees, at which point the stem has been adjusted and is operable to hold the armature in the full stroke position without continued manipulation.

5. An automatically adjusting control valve, comprising:
    a valve body;
    a valve seat within the valve body;
    a sealing disc adjacent the valve seat when the valve is closed and offset from the valve seat when the valve is open;
    an armature adjacent the sealing disc and operable to move the sealing disc linearly within the valve body;
    a biasing mechanism which biases the armature toward a first position; and
    an actuation stem configured to overcome the biasing mechanism and move the armature between the first position and a second position upon manual operation, wherein the actuation stem is a single rotatable structure, wherein the actuation stem comprises a portion which engages the armature during movement between the first position and the second position, wherein the portion is configured to deform to accommodate manufacturing tolerances of the valve; wherein the portion of the stem is a primary protrusion, wherein the stem further comprises a secondary protrusion, and wherein the secondary protrusion limits deformation of the primary protrusion and provides for manual operation of the valve should the primary protrusion fail.

6. The valve as set forth in claim 5, wherein the stem is configured to move from a zero position to a hold position and wherein, during initial operation of the stem, the armature completely traverses from the first position to the second position by movement of the stem from the zero position to a deformation position, with the deformation position being between the zero position and the hold position.

7. The valve as set forth in claim 6, wherein continued manipulation of the stem is required to overcome the bias mechanism with the stem between the zero position and the hold position.

8. The valve as set forth in claim 6, wherein continued manipulation of the stem is required to overcome the bias mechanism with the stem between the zero position and the deformation position.

9. The valve as set forth in claim 6, wherein continued manipulation of the stem is not required to overcome the bias mechanism when the stem is in the hold position.

10. The valve as set forth in claim 6, wherein initial movement of the stem between the deformation position and the hold position deforms the portion of the stem, thereby accommodating manufacturing tolerances of the valve.

11. The valve as set forth in claim 5, wherein the stem is operated by rotation about an axis and the portion is offset from the axis, such that rotation of the stem causes the portion to push the armature from the first position to the second position overcoming the bias mechanism.

12. The valve as set forth in claim 5, wherein the bias mechanism is not operable to resist movement of the armature enough to deform the portion of the stem.

13. The valve as set forth in claim 5, wherein a movement limiter is operable to resist movement of the armature enough to deform the portion of the stem.

14. The valve as set forth in claim 5, wherein the stem is configured to overcome the biasing mechanism and move the armature between a fully closed position and a fully open position upon manual operation.

15. The valve as set forth in claim 5, wherein the stem is configured to move the armature from the first position to the second position upon manual rotation of the stem through ninety degrees.

16. An automatically adjusting control valve, comprising:
a valve body;
a valve seat within the valve body;
a sealing disc adjacent the valve seat when the valve is closed and offset from the valve seat when the valve is open;
an armature adjacent the sealing disc and operable to move the sealing disc linearly within the valve body;
a movement limiter operable to limit movement of the armature, and thus the sealing disc, to between a fully closed position and a fully open position;
a spring which biases the armature toward the fully closed position; and
a stem configured to move the armature from the fully closed position to the fully open position, overcoming the spring, upon manual rotation, wherein the stem is configured to rotate ninety degrees from a zero position, where the armature is in the fully closed position, and a hold position, where the stem holds the armature in the fully open position;
wherein the stem comprises a single rotatable structure having a portion which engages the armature during movement between the fully closed position and the fully open position, wherein the portion is configured to deform to accommodate manufacturing tolerances of the valve, and wherein the stem thereafter substantially retains a shape induced by the deformation; wherein the portion of the stem is a primary protrusion, wherein the stem further comprises a secondary protrusion, and wherein the secondary protrusion limits deformation of the primary protrusion and provides for manual operation of the valve should the primary protrusion fail.

17. The valve as set forth in claim 16, wherein, during initial operation of the stem, the armature completely traverses from the fully closed position to the fully open position by movement of the stem from the zero position to a deformation position, with the deformation position being between the zero position and the hold position.

18. The valve as set forth in claim 17, wherein initial movement of the stem between the deformation position and the hold position deforms the portion of the stem, thereby accommodating manufacturing tolerances of the valve.

19. The valve as set forth in claim 16, wherein the movement limiter is operable resist movement of the armature enough to deform the portion of the stem.

* * * * *